United States Patent
Dong

(10) Patent No.: US 12,425,988 B2
(45) Date of Patent: Sep. 23, 2025

(54) PROCESSING CAPABILITY REQUEST, PROCESSING CAPABILITY SENDING, AND PROCESSING CAPABILITY RECEIVING METHODS AND APPARATUSES

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 383 days.

(21) Appl. No.: 18/017,667

(22) PCT Filed: Aug. 14, 2020

(86) PCT No.: PCT/CN2020/109375
§ 371 (c)(1),
(2) Date: Jan. 23, 2023

(87) PCT Pub. No.: WO2022/032689
PCT Pub. Date: Feb. 17, 2022

(65) Prior Publication Data
US 2023/0276381 A1    Aug. 31, 2023

(51) Int. Cl.
*H04W 56/00* (2009.01)

(52) U.S. Cl.
CPC .................... *H04W 56/00* (2013.01)

(58) Field of Classification Search
CPC ... H04W 56/00; H04W 56/0065; H04W 4/80; H04W 8/005; H04W 8/24; H04L 67/51
USPC .................................................. 370/350, 329
See application file for complete search history.

(56) References Cited

U.S. PATENT DOCUMENTS

| | | | |
|---|---|---|---|
| 2014/0335885 A1* | 11/2014 | Steiner | H04W 64/00 455/456.1 |
| 2016/0014715 A1 | 1/2016 | Patil et al. | |
| 2016/0135178 A1 | 5/2016 | Mok et al. | |
| 2016/0157193 A1 | 6/2016 | Qi et al. | |
| 2016/0234704 A1* | 8/2016 | Aldana | H04L 43/0864 |
| 2016/0242056 A1 | 8/2016 | Patil et al. | |
| 2017/0245193 A1* | 8/2017 | Zhang | H04L 5/0055 |

FOREIGN PATENT DOCUMENTS

| | | |
|---|---|---|
| CN | 107251621 A | 10/2017 |
| CN | 109496439 A | 3/2019 |
| WO | 2016007782 A1 | 1/2016 |

OTHER PUBLICATIONS

International Search Report issued in Application No. PCT/CN2020/109375, dated Apr. 26, 2021, with English translation, (4p).
The extended European search report of application No. 20949187.7 dated on Jan. 26 2024.(11P).
India Registered Patent, Office Action issue in Application No. 202347006837 dated on Feb. 4, 2024 with English translation.(8P).

* cited by examiner

*Primary Examiner* — Ricardo H Castaneyra
(74) *Attorney, Agent, or Firm* — Arch & Lake LLP

(57) ABSTRACT

Processing capability information methods are provided. In one method, a processing capability information request method performed by a first terminal includes broadcasting a first message. The first message carries request information, and the request information is configured to request for processing capability information of a second terminal that has received the request information.

17 Claims, 8 Drawing Sheets broadcasting a first message, in which the first message carries request information, and the request information is configured to request for processing capability information of a second terminal that has received the request information — S101

FIG. 1 broadcasting a first message, in which the first message carries request information, and the request information is configured to request for processing capability information of a second terminal that has received the request information — S101 receiving a second message sent by the second terminal, in which the second message includes the processing capability information of the second terminal — S102

FIG. 2 broadcasting a first message, in which the first message carries request information, and the request information is configured to request for processing capability information of a second terminal that has received the request information — S101 receiving a second message sent by the second terminal, in which the second message includes the processing capability information of the second terminal — S102 determining, in response to the processing capability information comprising the identifier and the value, that the second terminal has the capability to determine the duration required to respond to the preset information as the fixed value, in which the fixed value is the value — S103 determining, based on the value, a target time for receiving an acknowledgement message sent by the second terminal in response to the preset information sent by the first terminal — S104

FIG. 3

PROCESSING CAPABILITY REQUEST, PROCESSING CAPABILITY SENDING, AND PROCESSING CAPABILITY RECEIVING METHODS AND APPARATUSES

CROSS-REFERENCE TO RELATED APPLICATION

This application is a national phase of International Application No. PCT/CN2020/109375, filed on Aug. 14, 2020, the content of which is hereby incorporated by reference in its entirety for all purposes.

TECHNICAL FIELD

The disclosure relates to the field of communication technologies, and provides a processing capability request method, a processing capability sending method, a processing capability receiving method, a processing capability request apparatus, a processing capability sending apparatus, a processing capability receiving apparatus, an electronic device, and a computer readable storage medium.

BACKGROUND

Ranging-based services are mainly based on the interaction of information such as a distance and an angle between devices. The ranging-based services can be applied in fields such as the social field, the consumer field, the smart home field or the modern industrial field. For example, the ranging-based service may be specifically applied in game interaction, music sharing, object/people search, or smart home control.

In order to perform a ranging-based service, the devices need to go through three processes, i.e., device discovery, device ranging, and device communication.

SUMMARY

According to a first aspect of the disclosure, a processing capability information request method, performed by a first terminal, is provided. The method includes:
broadcasting a first message, in which the first message carries request information, and the request information is configured to request for processing capability information of a second terminal that has received the request information.

According to a second aspect of the disclosure, a processing capability information sending method, performed by a second terminal, is provided. The method includes:
receiving a first message broadcasted by a first terminal, in which the first message carries request information, and the request information is configured to request for processing capability information of the second terminal that has received the request information; and
sending the processing capability information to the first terminal.

According to a third aspect of the disclosure, a processing capability information sending method, performed by a third terminal, is provided. The method includes:
broadcasting a third message, in which the third message carries processing capability information of the third terminal.

According to a fourth aspect of the disclosure, an electronic device is provided. The electronic device includes:
a processor;
a memory storing instructions executable by the processor; in which
the processor is configured to implement the processing capability information request method of any one of the above embodiments, and/or the processing capability information sending method of any one of the above embodiments.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a flowchart of a processing capability request method according to the embodiment of the disclosure.

FIG. 2 is a flowchart of a processing capability request method according to the embodiment of the disclosure.

FIG. 3 is a flowchart of a processing capability request method according to the embodiment of the disclosure.

DETAILED DESCRIPTION

Figure 4:
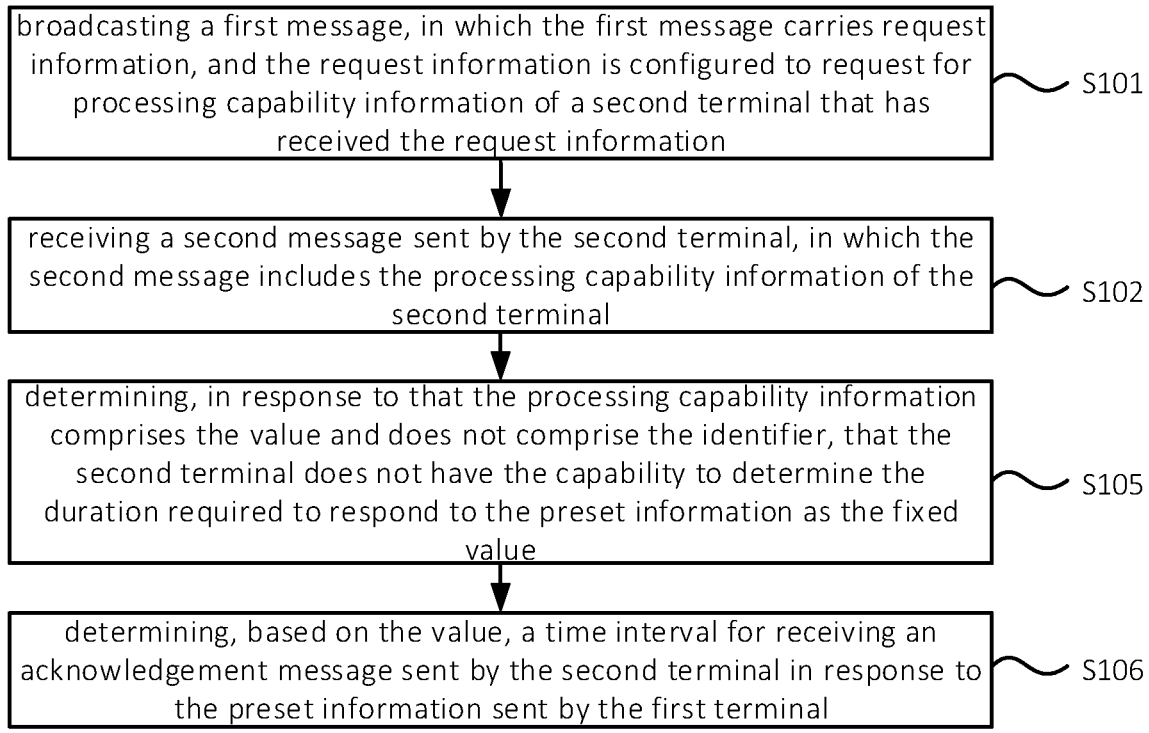
FIG. 4 is a flowchart of a processing capability request method according to the embodiment of the disclosure.

The technical solution in the embodiments of the disclosure will be clearly and completely described below in combination with the accompanying drawings in the embodiments of the disclosure. Obviously, the embodiments described are only a part of the embodiments of the disclosure, and not all of the embodiments of the disclosure. Based on the embodiments of the disclosure, all the other embodiments obtained by those skilled in the art without inventive works fall within the scope of protection of the disclosure.

FIG. 1 is a flowchart of a processing capability request method according to the embodiment of the disclosure. The method described in this embodiment may be performed by a first terminal. The first terminal includes, but is not limited to, a cell phone, a tablet computer, a wearable device, a sensor, and an Internet of Things (IoT) device. The second terminal in the following embodiment may be a second terminal to which the subsequent processing capability sending method is applicable.

The first terminal may perform the ranging-based services, which include, but are not limited to, measuring respective distances to other devices, measuring respective angles relative to other devices, measuring both distances and angles relative to other devices, and measuring locations relative to other devices.

However, to perform the ranging-based services, other devices need to be involved, so that the first terminal needs to firstly discover other nearby devices that are also capable of performing the ranging-based services. Based on the following embodiments, the first terminal can discover other nearby devices that are also capable of performing the ranging-based services, such as the second terminal. During the ranging-based services, the first terminal may be called a discovery device or an announcing device, and the second terminal may be called a discoveree device or a monitoring/listening device.

As shown in FIG. 1, the processing capability request method may include the following steps.

At step S101, a first message is broadcasted, in which the first message carries request information, and the request information is configured to request for processing capability information of a second terminal that has received the request information.

In an embodiment, since the first terminal does not know nearby terminals or which nearby terminals support the devices that are capable of performing the ranged-based services, the first message can be sent by broadcasting to ensure that all the nearby terminals can receive the first message.

The first message carries the request information, and the request information is configured to request for the processing capability information of the second terminal that has received the request information. The second terminal does not specifically refer to a certain terminal, but to a terminal near the first terminal that has received the request information.

After receiving the first message, if the second terminal supports the ranging-based services, the second terminal may send a second message to the first terminal based on the request, and the processing capability information of the second terminal is carried in the second message. After receiving the processing capability information of the second terminal, the first terminal may determine a distance between the second terminal and the first terminal based on the processing capability information or determine the distance between the second terminal and the first terminal in a subsequent ranging process.

It should be noted that determining the distance between the second terminal and the first terminal based on the processing capability information is only one example of the ranging-based services performed by the first terminal based on the processing capability information. Other information can also be determined based on the processing capability information, such as, a location relative to the second terminal. This embodiment and other embodiments are described primarily based on the example of determining the distance.

In an embodiment, the processing capability information includes at least one of:

an amount of data processed per unit of time, or a duration required to respond to preset information (which can be called reply time or Rx-Tx timing).

When the processing capability information is the amount of data processed per unit time, the first terminal may calculate a duration required for the second terminal to respond to the preset information based on the amount of data processed per unit time, determine a target time for receiving response information from the second terminal for subsequent communication with the second terminal based on the duration required for responding to the preset information, and determine the distance between the second terminal and the first terminal.

The preset information may be a ranging request and/or a ranging signal sent by the first terminal to the second terminal, and the response information sent by the second terminal to the first terminal in response to the preset information may be an acknowledgement (ACK) message.

For example, after the first terminal determines a duration T0 required for the second terminal to respond to the preset information, the first terminal may determine a first time T1 when the first terminal sends the preset information to the second terminal and a second time T2 when the first terminal receives the response information sent by the second terminal in response to the preset information, and then the difference between T1 and T2 (i.e., T2−T1) is a total duration of the above process in which the first terminal sends the preset information to the second terminal, the second terminal responds to the preset information, and then the first terminal receives the response information. The duration required for the second terminal to respond to the preset information is subtracted from the total duration (i.e., T2−T1−T0), to obtain the duration from the time when the first terminal sends the preset information to the second terminal to the time when the first terminal receives the response information from the second terminal is obtained.

Since a propagation speed of both the preset information and the response information is the speed of light c, (T2−T1−T0)/c is a sum of the distance from the first terminal to the second terminal and the distance from the second terminal to the first terminal, which is twice the distance between the first terminal and the second terminal (i.e., 2d), and then the distance between the first terminal and the second terminal can be calculated according to $d=(T2-T1-T0)c/2$.

According to the embodiment of the disclosure, by carrying the request information in the broadcasted first message, the first terminal can not only determine which nearby terminals can perform the ranging-based services, but also enable the second terminal supporting the ranging-based services to send the processing capability information of the second terminal to the first terminal, so that the first terminal can determine, according to the processing capability information, the subsequent ranging method and the duration required for the second terminal to respond to the ranging information, which is beneficial to the subsequent raging process of the first terminal and the second terminal. Moreover, the distance between the first terminal and the second terminal is further determined, to allow the ranging-based services with the second terminal.

In an embodiment, the first terminal may initiate the ranging-based services via a target application, and when the target application initiates the ranging-based services, the first terminal is triggered to broadcast the first message. The request information may be represented as an identifier of the target application, an information element in the first message, or an identifier of the target application and an information element. Upon receipt of the first message, the second terminal may determine that the first terminal needs to perform the ranging-based services based on the identifier of the target application and/or the information element.

Optionally, the preset information includes one of request information of a preset service or a reference signal of a preset service, and the duration required to respond to the preset information includes:

a duration from a time when the second terminal receives the preset information sent by another terminal to a time when the second terminal sends feedback information responded to the preset information to another terminal.

In an embodiment, another terminal includes, but is not limited to, the first terminal, and the preset information includes, but is not limited to, the ranging request and/or the ranging signal.

When the duration required to respond to the preset information is a length of time from the time when the second terminal receives the preset information sent by another terminal to the time when the second terminal sends the feedback information in response to the preset information to another terminal, the first terminal can directly determine the T0 required by the second terminal to respond to the preset information after receiving the preset information sent by the first terminal, so that the distance d from the first terminal to the second terminal is calculated based on the T1 when the first terminal sends the preset information to the second terminal and based on the T2 when the first terminal receives the response information sent by the second terminal in response to the preset information and according to $d=(T2-T1-T0)c/2$ as described in the above-mentioned embodiment.

Optionally, the preset information is a synchronization signal, and the duration required to respond to the preset information includes:

a deviation value of the time when the second terminal receives the synchronization signal sent by another terminal relative to a synchronization raster of the second terminal, and a deviation value of the time when the second terminal sends the synchronization signal to another terminal relative to the synchronization raster of the second terminal.

In an embodiment, another terminal includes, but is not limited to, the first terminal, and the preset information includes, but is not limited to, the synchronization signal.

When the duration required to respond to the preset information includes the deviation value of the time when the second terminal receives the synchronization signal sent by the first terminal relative to the synchronization raster of the second terminal, and the deviation value of the time when the second terminal sends the synchronization signal to the first terminal relative to the synchronization raster of the second terminal, in order to determine the distance between the first terminal and the second terminal, the first terminal also needs to determine the deviation value of the time when the first terminal sends the synchronization signal to the second terminal relative to the synchronization raster of the first terminal, and the deviation value of the time when the first terminal receives the synchronization signal sent by the second terminal relative to the synchronization raster of the first terminal.

For example, the deviation value of the time when the first terminal sends the synchronization signal to the second terminal relative to the synchronization raster (slot n, symbol l) of the first terminal is t1. The deviation value of the time when the second terminal receives the synchronization signal sent by the first terminal relative to the synchronization raster (slot n, symbol l) of the second terminal is t2. The deviation value of the time when the second terminal sends the synchronization signal to the first terminal relative to the synchronization raster (slot m, symbol k) of the second terminal is t3. The deviation value of the time when the first terminal receives the synchronization signal sent by the second terminal relative to the synchronization raster (slot m, symbol k) of the second terminal is t4. In the above examples, m and n can be understood as time slot numbers, and l and k can be understood as the lth symbol and the kth symbol in the time slot.

The synchronization signal is sent by the first terminal to the second terminal, and after receiving the synchronization signal, the second terminal sends the response information to the first terminal. The response information can be a synchronization signal, the duration for the first terminal to receive the response information sent by the second terminal is RD_time=(m−n)*T_slot+(k−l)*T_sym+(t1+t4), and the duration from the time when the second terminal receives the synchronization signal sent by the first terminal to the time when the second terminal sends the synchronization signal to the first terminal is Reply_time=(m−n)*T_slot+(k−l)*T_sym−(t2+t3), in which T_slot represents the duration of the time slot and T_sym represents the duration of the symbol.

The duration of the synchronization signal transmitted back and forth between the first terminal and the second terminal is RD_time−Reply_time=t1+t2+t3+t4, and then the distance between the first terminal and the second terminal is $d=(t1+t2+t3+t4)c/2$.

FIG. 2 is a flowchart of a processing capability request method according to the embodiment of the disclosure. As shown in FIG. 2, the method further includes the following steps.

At step S102, a second message sent by the second terminal is received, in which the second message includes the processing capability information of the second terminal.

In an embodiment, if the second terminal is capable of performing the ranging-based services, after the second terminal receives the first message sent by the first terminal, the second terminal may send the processing capability information to the first terminal in response to the request information in the first message, and the processing capability information may be carried in the second message and sent to the first terminal. In addition to the processing capability information, the second message may also carry other information, such as the identifier of the second terminal.

It should be noted that when there is no second terminal near the first terminal, or when there is a second terminal near the first terminal but the second terminal cannot perform the ranging-based services, and then step S102 may not be performed.

Optionally, the processing capability information includes at least one of:
an identifier, configured to indicate that the second terminal has a capability to determine the duration required to respond to the preset information as a fixed value; or
a value, configured to indicate the duration required for the second terminal to respond to the preset information.

In an embodiment, the processing capability information may include the identifier, the value, or both the identifier and the value.

The value is configured to indicate the duration required for the second terminal to respond to the preset information, and the identifier is configured to indicate that the second terminal has the capability to determine the duration required to respond to the preset information as the fixed value. That is, when the identifier is included in the processing capability information, the duration required for the second terminal to respond to the preset information is the fixed value each time, and then the first terminal only needs to receive the duration required for the second terminal to respond to the preset information sent by the second terminal once, and all the subsequent response information from the second terminal in response to the preset information sent by the first terminal can be received according to the fixed value.

If the processing capability information includes the value and does not include the identifier, it indicates that the second terminal does not have the capability to determine the duration required to respond to the preset information as the fixed value. Although the value still represents the duration required for the second terminal to respond to the preset information, the representation is relatively rough and the value cannot be applied directly by the first terminal to the subsequent ranging process, and the duration required for the second terminal to respond to the preset information sent by the first terminal can only be determined roughly.

For example, if the processing capability information includes the value and does not include the identifier, the first terminal may determine that the value represents the time interval for sending the ACK message by the second terminal in response to the preset information sent by the first terminal, such as the duration required for the second terminal to send the ACK message to the first terminal after receiving the ranging signal sent by the first terminal, which is not an exact response duration. For example, the processing capability information includes both data and the identifier, and the first terminal may determine that the value represents the duration required for the second terminal to respond to the preset information from the first terminal.

FIG. 3 is a flowchart of a processing capability request method according to the embodiment of the disclosure. As shown in FIG. 3, the method further includes the following steps.

At step S103, in response to the processing capability information including the identifier and the value, it is determined that the second terminal has the capability to determine the duration required to respond to the preset information as the fixed value, in which the fixed value is the value.

At step S104, based on the value, a target time for receiving an ACK message sent by the second terminal in response to the preset information sent by the first terminal is determined.

In an embodiment, where the processing capability information includes the identifier and the value, the first terminal can determine that the second terminal has the capability to determine the duration required to respond to the preset information as the fixed value, and the fixed value is the value. The value in the processing capability information represents the duration required for the second terminal to respond to the preset information from the first terminal. In the subsequent ranging process, the first terminal can determine the target time for receiving the ACK message sent by the second terminal in response to the preset information sent by the first terminal based on the value, and thus the ACK message sent by the second terminal at the target time can be received, and the value can be directly used during the ranging process without the need for the second terminal to send the duration required for the second terminal to respond to the preset information to the first terminal again.

Since the second terminal has the capability to determine the duration required to respond to the preset information as the fixed value, the duration required for the second terminal to respond to the preset information is fixed, and then the second terminal only needs to send the value once to the first terminal to represent the fixed value, and the duration required for the second terminal to respond to the preset information may not be sent to the first terminal subsequently.

It is to be noted that in this embodiment and other embodiments, the ACK message sent by the second terminal in response to the preset information sent by the first terminal may be an ACK message in response to the ranging request and/or the ranging signal sent by the first terminal.

FIG. 4 is a flowchart of a processing capability request method according to the embodiment of the disclosure. As shown in FIG. 4, the processing capacity information includes the value, and the method further includes the following steps.

At step S105, in response to that the processing capability information includes the value and does not include the identifier, it is determined that the second terminal does not have the capability to determine the duration required to respond to the preset information as the fixed value.

At step S106, based on the value, a time interval for receiving an ACK message sent by the second terminal in response to the preset information sent by the first terminal is determined.

In an embodiment, when the processing capability information includes the value and does not include the identifier, the first terminal may determine that the second terminal does not have the capability to determine the duration required to respond to the preset information as the fixed value, and may also determine that the duration required for the second terminal to respond to the preset information as indicated by the value in the processing capability information is relatively rough. The first terminal may not accurately determine the target time in the above embodiment based on the value, but it can determine the time interval for sending the ACK message by the second terminal in response to the preset information sent by the first terminal. For example the time interval is greater than or equal to the duration corresponding to the value, so that the ACK message sent by the second terminal can be received based on the time interval to avoid wasting power by trying to receive the ACK message sent by the second terminal too frequently. In the subsequent ranging process, the second terminal also needs to send the time needed to prepare and respond to the preset information to the first terminal.

In order to enable the first terminal to determine a specific target time, the second terminal sends the duration required for the second terminal to respond to the preset information sent by the first terminal to the first terminal when sending the ACK message. However, since the second terminal does not have the capability to determine the duration required to respond to the preset information as the fixed value, the duration required for the second terminal to respond to the preset information is not fixed, and then the second terminal needs to re-determine the duration required for the second terminal to respond to the preset information each time it receives the preset information from the first terminal, and sends the determined duration required for the second terminal to respond to the preset information to the first terminal.

Figure 5:
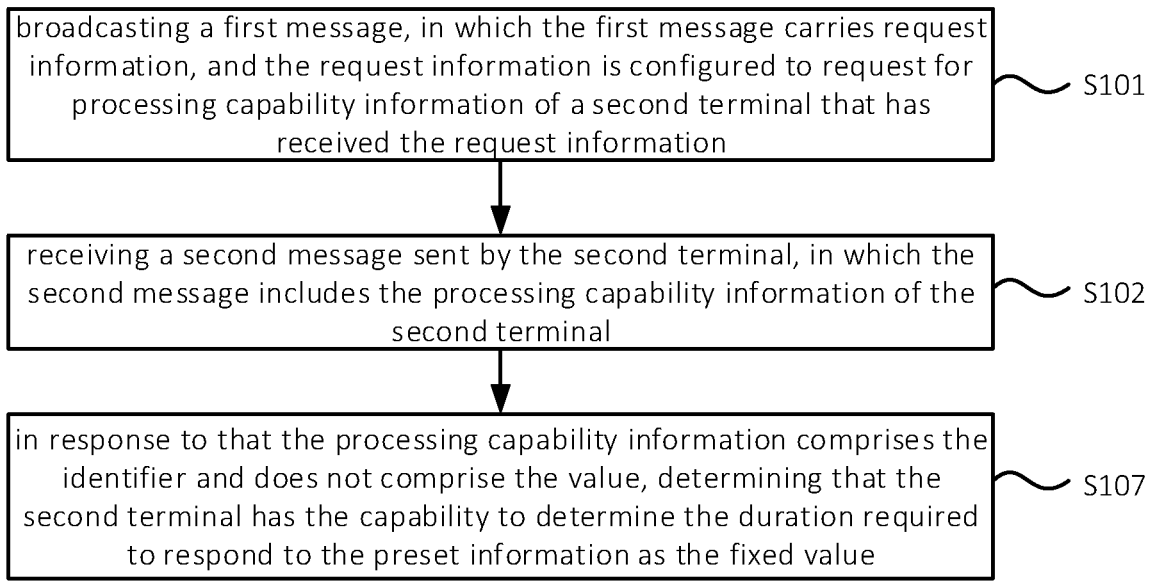
FIG. 5 is a flowchart of a processing capability request method according to the embodiment of the disclosure.

FIG. 5 is a flowchart of a processing capability request method according to the embodiment of the disclosure. As shown in FIG. 5, the processing capability information includes the identifier, and the method further includes the following steps.

At step S107, in response to that the processing capability information includes the identifier and does not include the value, it is determined that the second terminal has the capability to determine the duration required to respond to the preset information as the fixed value.

In an embodiment, the processing capability information may also include only the identifier, in which case the terminal may determine that the second terminal has the capability to determine the duration required to respond to the preset information as the fixed value, but may fail to send the identifier together with the value to the first terminal for some reasons, such as insufficient communication resources. Subsequently, the second terminal sends the value to the first terminal, and then the first terminal may receive from the second terminal the duration required for the second terminal to respond to the preset information during subsequent communication with the second terminal based on the identifier.

Figure 6:
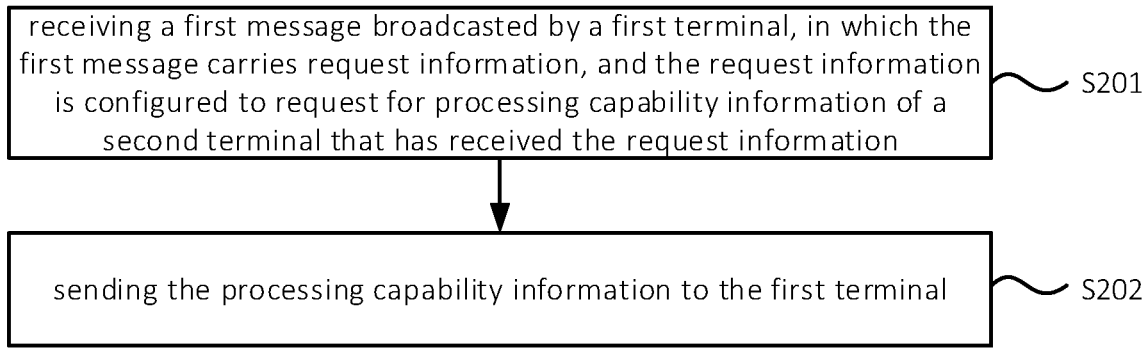
FIG. 6 is a flowchart of a processing capability sending method according to the embodiment of the disclosure.

FIG. 6 is a flowchart of a processing capability sending method according to the embodiment of the disclosure. The method described in this embodiment may be applicable to the second terminal. The second terminal includes, but is not limited to, a cell phone, a tablet computer, a wearable device, a sensor, and an IoT device. The first terminal in the following embodiment may be the first terminal to which the above-described processing capability request method is applicable.

As shown in FIG. 6, the processing capability sending method includes the following steps.

At step S201, a first message broadcasted by a first terminal is received, in which the first message carries request information, and the request information is configured to request for processing capability information of a second terminal that has received the request information.

At step S202, the processing capability information is sent to the first terminal.

In an embodiment, the first terminal may send the first message by broadcasting, and after receiving the first message, the second terminal may send a second message to the first terminal if the second terminal supports the ranging-based services, and the processing capability information of the second terminal is carried in the second message. After receiving the processing capability information of the second terminal, the first terminal may determine the distance between the second terminal and the first terminal based on the processing capability information.

According to the embodiment of the disclosure, the second terminal sends the processing capability information to the first terminal based on the request information in the first message, so that the first terminal can not only determine that the second terminal is capable of performing the ranging-based services, but also determine a target time for receiving the response information from the second terminal based on the processing capability information, so that the first terminal can perform subsequent communication with the second terminal, and the distance between the second terminal and the first terminal can be further determined for performing the ranging-based services with the second terminal.

Optionally, the processing capability information includes at least one of:

an amount of data processed per unit of time, or a duration required to respond to preset information.

Optionally, the preset information includes one of request information of a preset service or a reference signal of a preset service, and the duration required to respond to the preset information includes:

a duration from a time when the second terminal receives the preset information sent by another terminal to a time when the second terminal sends feedback information responded to the preset information to another terminal.

In an embodiment, the first terminal includes, but is not limited to, the first terminal, and the preset information includes, but is not limited to, the ranging request and/or the ranging signal.

When the duration required to respond to the preset information is the length of time between a time when the second terminal receives the preset information sent by another terminal to a time when the second terminal sends the feedback information in response to the preset information to another terminal, the first terminal may directly determine the T0 required for the second terminal to respond to the preset information after the second terminal receives the preset information sent by the first terminal, so that the distance d between the second terminal and the first terminal can be calculated based on the T1 when the first terminal sends the preset information to the second terminal, and based on the T2 when the first terminal receives the response information sent by the second terminal in response to the preset information, according to d=(T2−T1−T0)c/2 as described in the above embodiments.

Optionally, the preset information is a synchronization signal, and the duration required to respond to the preset information includes:

a deviation value of the time when the second terminal receives the synchronization signal sent by another terminal relative to a synchronization raster of the second terminal, and a deviation value of the time when the second terminal sends the synchronization signal to another terminal relative to the synchronization raster of the second terminal.

In an embodiment, another terminal includes, but is not limited to, the first terminal, and the preset information includes, but is not limited to, the synchronization signal.

When the duration required to respond to the preset information includes the deviation value of the time when the second terminal receives the synchronization signal sent by the first terminal relative to the synchronization raster of the second terminal, and the deviation value of the time when the second terminal sends the synchronization signal to the first terminal relative to the synchronization raster of the second terminal, in order to determine the distance between the first terminal and the second terminal, the first terminal also needs to determine the deviation value of the time when the first terminal sends the synchronization signal to the second terminal relative to the synchronization raster of the first terminal, and the deviation value of the time when the first terminal receives the synchronization signal sent by the second terminal relative to the synchronization raster of the first terminal.

For example, the deviation value of the time when the first terminal sends the synchronization signal to the second terminal relative to the synchronization raster (slot n, symbol l) of the first terminal is t1. The deviation value of the time when the second terminal receives the synchronization signal sent by the first terminal relative to the synchronization raster (slot n, symbol l) of the second terminal is t2. The deviation value of the time when the second terminal sends the synchronization signal to the first terminal relative to the synchronization raster (slot m, symbol k) of the second terminal is t3. The deviation value of the time when the first terminal receives the synchronization signal sent by the second terminal relative to the synchronization raster (slot m, symbol k) of the second terminal is t4. In the above examples, m and n can be understood as time slot numbers, and l and k can be understood as the lth symbol and the kth symbol in the time slot.

The synchronization signal is sent by the first terminal to the second terminal, and after receiving the synchronization signal, the second terminal sends the response information to the first terminal. The response information can be a synchronization signal, the duration for the first terminal to receive the response information sent by the second terminal is RD_time=(m−n)*T_slot+(k−l)*T_sym+(t1+t4), and the duration from the time when the second terminal receives the synchronization signal sent by the first terminal to the time when the second terminal sends the synchronization signal to the first terminal is Reply_time=(m−n)*T_slot+(k−l)*T_sym−(t2+t3), in which T_slot represents the duration of the time slot and T_sym represents the duration of the symbol.

The duration of the synchronization signal transmitted back and forth between the first terminal and the second terminal is RD_time−Reply_time=t1+t2+t3+t4, and then the distance between the first terminal and the second terminal is d=(t1+t2+t3+t4)c/2.

Optionally, the processing capability information includes at least one of:
 an identifier, configured to indicate that the second terminal has the capability to determine the duration required to respond to the preset information as a fixed value; or
 a value, configured to indicate the duration required for the second terminal to respond to the preset information.

In an embodiment, the processing capability information may include the identifier, the value, or both the identifier and the value.

The value is configured to indicate the duration required for the second terminal to respond to the preset information, and the identifier is configured to indicate that the second terminal has the capability to determine the duration required to respond to the preset information as the fixed value. That is, when the identifier is included in the processing capability information, the duration required for the second terminal to respond to the preset information is the fixed value each time, and then the first terminal only needs to receive the duration required for the second terminal to respond to the preset information sent by the second terminal once, and the response information of the second terminal in response to the preset information sent by the first terminal can be received subsequently according to the fixed value.

If the processing capability information includes the value and does not include the identifier, it indicates that the second terminal does not have the capability to determine the duration required to respond to the preset information as the fixed value. Although the value still represents the duration required for the second terminal to respond to the preset information, the representation is relatively rough and the value cannot be applied directly by the first terminal to the subsequent ranging process, and the duration required for the second terminal to respond to the preset information sent by the first terminal can only be determined roughly.

For example, if the processing capability information includes the value and does not include the identifier, the first terminal may determine that the value represents the time interval for sending the ACK message by the second terminal in response to the preset information sent by the first terminal, such as the duration required for the second terminal to send the ACK message to the first terminal after receiving the ranging signal sent by the first terminal, which is not an exact response duration. For example, the processing capability information includes both data and the identifier, and the first terminal may determine that the value represents the duration required for the second terminal to respond to the preset information from the first terminal.

Figure 7:
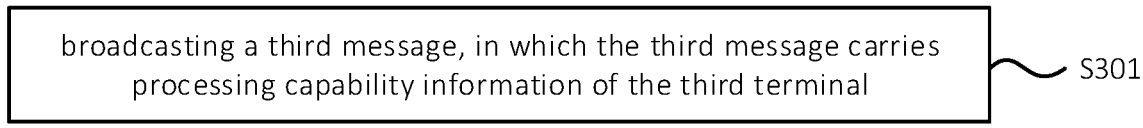
FIG. 7 is a flowchart of a processing capability request method according to the embodiment of the disclosure.

FIG. 7 is a flowchart of a processing capability request method according to the embodiment of the disclosure. The method described in this embodiment may be applicable to the third terminal. The third terminal includes, but is not limited to, a cell phone, a tablet computer, a wearable device, a sensor, and an IoT device. The fourth terminal in the following embodiment may be the fourth terminal to which the above-described processing capability sending method is applicable.

The third terminal may perform the ranging-based services, which include, but are not limited to, measuring a distance to another terminal, measuring an angle relative to another terminal, measuring a distance and an angle relative to another terminal, and measuring a location relative to another terminal.

However, to perform the ranging-based services, other devices need to be involved, so that the third terminal needs to firstly discover other nearby devices that are also capable of performing the ranging-based services. Based on the following embodiments, the third terminal can discover other nearby devices that are also capable of performing the ranging-based services by broadcasting its processing capability information, such as the fourth terminal. During the ranging-based services, the third terminal may be called a discoveree device, and the fourth terminal is called a discovery device.

As shown in FIG. 7, the processing capability sending method includes the following steps.

At step S301, a third message is broadcasted, in which the third message carries processing capability information of the third terminal.

In an embodiment, since the third terminal does not know nearby terminals or which nearby terminals supports the devices that are capable of performing the ranged-based services, the third message can be sent by broadcasting to ensure that all the nearby terminals can receive the third message.

The processing capability information of the third terminal can be carried in the third message. After the fourth terminal receives the third message, if the fourth terminal supports the ranging-based services, the duration required for the third terminal to respond to the ranging information can be determined based on the processing capability information of the third terminal in the third message, so that the fourth terminal can carry out the subsequent ranging process with the third terminal and further determine the distance between the third terminal and the fourth terminal to carry out the ranging-based services with the third terminal.

In an embodiment, the third terminal may initiate the ranged-based services via a target application, and when the ranged-based services are initiated by the target application, the third terminal may be triggered to broadcast the third message. The processing capability information in the third message may be represented as the identifier of the target application, an information element in the third message, or the identifier of the target application and the information element. After receiving the third message, the fourth terminal may determine that the third terminal needs to perform the ranged-based services based on the identifier of the target application and/or the information element.

It should be noted that the third terminal and the fourth terminal in the preceding embodiments may be the same terminal, but the fourth terminal is described from the perspective of a discovery device and the third terminal is described from the perspective of a discoveree device.

Optionally, the processing capability information includes at least one of:
an amount of data processed per unit of time, or a duration required to respond to preset information.

Optionally, the preset information includes one of request information of a preset service or a reference signal of a preset service, and the duration required to respond to the preset information includes:
a duration from a time when the third terminal receives the preset information sent by another terminal to a time when the third terminal sends feedback information responded to the preset information to another terminal.

In an embodiment, another terminal includes, but is not limited to the fourth terminal, and the preset information includes, but is not limited to, the ranging request and/or the ranging signal.

When the duration required to respond to the preset information is a length of time from the time when the third terminal receives the preset information sent by another terminal to the time when the third terminal sends the feedback information in response to the preset information to another terminal, the fourth terminal can directly determine the T0 required by the third terminal to respond to the preset information after receiving the preset information sent by the fourth terminal, so that the distance d between the fourth terminal and the third terminal is calculated based on the T1 when the fourth terminal sends the preset information to the third terminal and based on the T2 when the fourth terminal receives the response information sent by the third terminal in response to the preset information and according to $d=(T2-T1-T0)c/2$ as described in the above-mentioned embodiment.

Optionally, the preset information is a synchronization signal, and the duration required to respond to the preset information includes:
a deviation value of the time when the third terminal receives the synchronization signal sent by another terminal relative to a synchronization raster of the third terminal, and a deviation value of the time when the third terminal sends the synchronization signal to another terminal relative to the synchronization raster of the third terminal.

In an embodiment, another terminal includes, but is not limited to the fourth terminal, and the preset information includes, but is not limited to, the synchronization signal.

When the duration required to respond to the preset information includes: the deviation value of the time when the third terminal receives the synchronization signal sent by the fourth terminal relative to the synchronization raster of the third terminal, and the deviation value of the time when the third terminal sends the synchronization signal to the fourth terminal relative to the synchronization raster of the third terminal, in order to determine the distance between the third terminal and the fourth terminal, the fourth terminal also needs to determine the deviation value of the time when the fourth terminal sends the synchronization signal to the third terminal relative to the synchronization raster of the fourth terminal, and the deviation value of the time when the fourth terminal receives the synchronization signal sent by the third terminal relative to the synchronization raster of the fourth terminal.

For example, the deviation value of the time when the fourth terminal sends the synchronization signal to the third terminal relative to the synchronization raster (slot n, symbol l) of the fourth terminal is t1. The deviation value of the time when the third terminal receives the synchronization signal sent by the fourth terminal relative to the synchronization raster (slot n, symbol l) of the third terminal is t2. The deviation value of the time when the third terminal sends the synchronization signal to the fourth terminal relative to the synchronization raster (slot m, symbol k) of the third terminal is t3. The deviation value of the time when the fourth terminal receives the synchronization signal sent by the third terminal relative to the synchronization raster (slot m, symbol k) of the fourth terminal is t4. In the above examples, m and n can be understood as time slot numbers, and l and k can be understood as the lth symbol and the kth symbol in the time slot.

The synchronization signal is sent by the fourth terminal to the third terminal, and after receiving the synchronization signal, the third terminal sends the response information to the fourth terminal. The response information can be a synchronization signal, the duration for the fourth terminal to receive the response information sent by the third terminal is $RD\_time=(m-n)*T\_slot+(k-l)*T\_sym+(t1+t4)$, and the duration from the time when the third terminal receives the synchronization signal sent by the fourth terminal to the time when the fourth terminal sends the synchronization signal to the third terminal is $Reply\_time=(m-n)*T\_slot+(k-l)*T\_sym-(t2+t3)$, in which T_slot represents the duration of the time slot and T_sym represents the duration of the symbol.

The duration of the synchronization signal transmitted back and forth between the fourth terminal and the third terminal is RD_time−Reply_time=t1+t2+t3+t4, and then the distance between the fourth terminal and the third terminal is d=(t1+t2+t3+t4)c/2.

Optionally, the processing capability information includes the identifier and/or the value. The value is configured to represent the duration required for the third terminal to respond to the preset information, and the identifier is configured to represent that the third terminal has the capability to determine the duration required to respond to the preset message as the fixed value.

In an embodiment, the processing capability information includes at least one of:

an identifier, configured to indicate that the third terminal has the capability to determine the duration required to respond to the preset information as a fixed value; or a value, configured to indicate the duration required for the third terminal to respond to the preset information.

The value is configured to indicate the duration required for the third terminal to respond to the preset information, and the identifier is configured to indicate that the third terminal has the capability to determine the duration required to respond to the preset information as the fixed value. That is, when the identifier is included in the processing capability information, the duration required for the third terminal to respond to the preset information is the fixed value each time, and then the fourth terminal only needs to receive the duration required for the third terminal to respond to the preset information sent by the third terminal once, and all the subsequent response information from the third terminal in response to the preset information sent by the fourth terminal can be received according to the fixed value.

If the processing capability information includes the value and does not include the identifier, it indicates that the third terminal does not have the capability to determine the duration required to respond to the preset information as the fixed value. Although the value still represents the duration required for the third terminal to respond to the preset information, the representation is relatively rough and the value cannot be applied directly by the fourth terminal to the subsequent ranging process, and the duration required for the third terminal to respond to the preset information sent by the fourth terminal can only be determined roughly.

For example, if the processing capability information includes the value and does not include the identifier, the fourth terminal may determine that the value represents the time interval for sending the ACK message by the third terminal in response to the preset information sent by the first terminal, such as the duration required for the third terminal to send the ACK message to the fourth terminal after receiving the ranging signal sent by the fourth terminal which is not an exact response duration. For example, the processing capability information includes both data and the identifier, and the fourth terminal may determine that the value represents the duration required for the third terminal to respond to the preset information from the fourth terminal.

Figure 8:
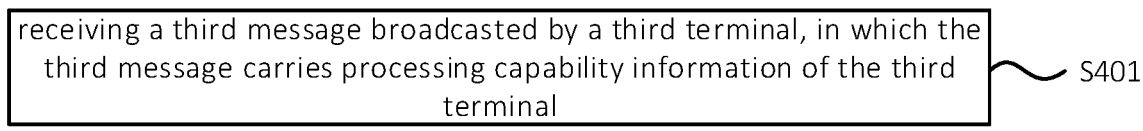
FIG. 8 is a flowchart of a processing capability receiving method according to the embodiment of the disclosure.

FIG. 8 is a flowchart of a processing capability receiving method according to the embodiment of the disclosure. The method described in this embodiment may be performed by a fourth terminal. The fourth terminal includes, but is not limited to, a cell phone, a tablet computer, a wearable device, a sensor, and an IoT device. The third terminal in the following embodiment may be a third terminal to which the subsequent processing capability sending method is applicable.

As shown in FIG. 8, the processing capability receiving method includes the following steps.

At step S401, a third message broadcasted by a third terminal is received, in which the third message carries processing capability information of the third terminal.

In an embodiment, since the third terminal does not know nearby terminals or which nearby terminals support the devices that are capable of performing the ranged-based services, the third message can be sent by broadcasting to ensure that all the nearby terminals can receive the third message.

The processing capability information of the third terminal can be carried in the third message. After the fourth terminal receives the third message, if the fourth terminal supports the ranging-based services, the duration required for the third terminal to respond to the ranging information can be determined based on the processing capability information of the third terminal in the third message, so that the fourth terminal can carry out the subsequent ranging process with the third terminal and further determine the distance between the third terminal and the fourth terminal to carry out the ranging-based services with the third terminal.

It should be noted that the fourth terminal and the second terminal in the preceding embodiments may be the same terminal, but the second terminal is described from the perspective of a discoveree device and the fourth terminal is described from the perspective of a discovery device.

Optionally, the processing capability information includes at least one of:

an amount of data processed per unit of time, or a duration required to respond to preset information.

In an embodiment, when the processing capability information is the amount of data processed per unit time, the fourth terminal can calculate the duration required for the third terminal to respond to the preset information based on the amount of data processed per unit time, and then determine the target time for receiving the response information from the third terminal based on the duration required for responding to the preset information for subsequent communication with the third terminal, and further determine the distance between the third terminal and the fourth terminal.

Optionally, the preset information includes one of request information of a preset service or a reference signal of a preset service, and the duration required to respond to the preset information includes:

a duration from a time when the third terminal receives the preset information sent by another terminal to a time when the third terminal sends feedback information responded to the preset information to another terminal.

In an embodiment, another terminal includes, but is not limited to the fourth terminal, and the preset information includes, but is not limited to, the ranging request and/or the ranging signal.

When the duration required to respond to the preset information is a length of time from the time when the third terminal receives the preset information sent by the fourth terminal to the time when the third terminal sends the feedback information in response to the preset information to the fourth terminal, the fourth terminal can directly determine the TO required by the third terminal to respond to the preset information after receiving the preset information sent by the fourth terminal, so that the distance d between the fourth terminal and the third terminal is calculated based on the T1 when the fourth terminal sends the preset information to the third terminal and based on the T2 when the fourth terminal receives the response information sent by the third terminal in response to the preset information and according to $d=(T2-T1-T0)c/2$ as described in the above-mentioned embodiment.

Optionally, the preset information is a synchronization signal, and the duration required to respond to the preset information includes:

a deviation value of the time when the third terminal receives the synchronization signal sent by another terminal relative to a synchronization raster of the third terminal, and a deviation value of the time when the third terminal sends the synchronization signal to another terminal relative to the synchronization raster of the third terminal.

In an embodiment, another terminal includes, but is not limited to the fourth terminal, and the preset information includes, but is not limited to, the synchronization signal.

When the duration required to respond to the preset information includes: the deviation value of the time when the third terminal receives the synchronization signal sent by the fourth terminal relative to the synchronization raster of the third terminal, and the deviation value of the time when the third terminal sends the synchronization signal to the fourth terminal relative to the synchronization raster of the third terminal, in order to determine the distance between the third terminal and the fourth terminal, the fourth terminal also needs to determine the deviation value of the time when the fourth terminal sends the synchronization signal to the third terminal relative to the synchronization raster of the fourth terminal, and the deviation value of the time when the fourth terminal receives the synchronization signal sent by the third terminal relative to the synchronization raster of the fourth terminal.

For example, the deviation value of the time when the fourth terminal sends the synchronization signal to the third terminal relative to the synchronization raster (slot n, symbol l) of the fourth terminal is t1. The deviation value of the time when the third terminal receives the synchronization signal sent by the fourth terminal relative to the synchronization raster (slot n, symbol l) of the third terminal is t2. The deviation value of the time when the third terminal sends the synchronization signal to the fourth terminal relative to the synchronization raster (slot m, symbol k) of the third terminal is t3. The deviation value of the time when the fourth terminal receives the synchronization signal sent by the third terminal relative to the synchronization raster (slot m, symbol k) of the fourth terminal is t4. In the above examples, m and n can be understood as time slot numbers, and l and k can be understood as the lth symbol and the kth symbol in the time slot.

The synchronization signal is sent by the fourth terminal to the third terminal, and after receiving the synchronization signal, the third terminal sends the response information to the fourth terminal. The response information can be a synchronization signal, the duration for the fourth terminal to receive the response information sent by the third terminal is $RD\_time=(m-n)*T\_slot+(k-l)*T\_sym+(t1+t4)$, and the duration from the time when the third terminal receives the synchronization signal sent by the fourth terminal to the time when the fourth terminal sends the synchronization signal to the third terminal is $Reply\_time=(m-n)*T\_slot+(k-l)*T\_sym-(t2+t3)$, in which T_slot represents the duration of the time slot and T_sym represents the duration of the symbol.

The duration of the synchronization signal transmitted back and forth between the first terminal and the second terminal is $RD\_time-Reply\_time=t1+t2+t3+t4$, and then the distance between the first terminal and the second terminal is $d=(t1+t2+t3+t4)c/2$.

Optionally, the processing capability information includes at least one of:

an identifier, configured to indicate that the third terminal has the capability to determine the duration required to respond to the preset information as a fixed value; or a value, configured to indicate the duration required for the third terminal to respond to the preset information.

The value is configured to indicate the duration required for the third terminal to respond to the preset information, and the identifier is configured to indicate that the third terminal has the capability to determine the duration required to respond to the preset information as the fixed value. That is, when the identifier is included in the processing capability information, the duration required for the third terminal to respond to the preset information is the fixed value each time, and then the fourth terminal only needs to receive the duration required for the third terminal to respond to the preset information sent by the third terminal once, and all the subsequent response information from the third terminal in response to the preset information sent by the fourth terminal can be received according to the fixed value.

If the processing capability information includes the value and does not include the identifier, it indicates that the third terminal does not have the capability to determine the duration required to respond to the preset information as the fixed value. Although the value still represents the duration required for the third terminal to respond to the preset information, the representation is relatively rough and the value cannot be applied directly by the fourth terminal to the subsequent ranging process, and the duration required for the third terminal to respond to the preset information sent by the fourth terminal can only be determined roughly.

For example, if the processing capability information includes the value and does not include the identifier, the fourth terminal may determine that the value represents the time interval for sending the ACK message by the third terminal in response to the preset information sent by the first terminal, such as the duration required for the third terminal to send the ACK message to the fourth terminal after receiving the ranging signal sent by the fourth terminal which is not an exact response duration. For example, the processing capability information includes both data and the identifier, and the fourth terminal may determine that the value represents the duration required for the third terminal to respond to the preset information from the fourth terminal.

Figure 9:
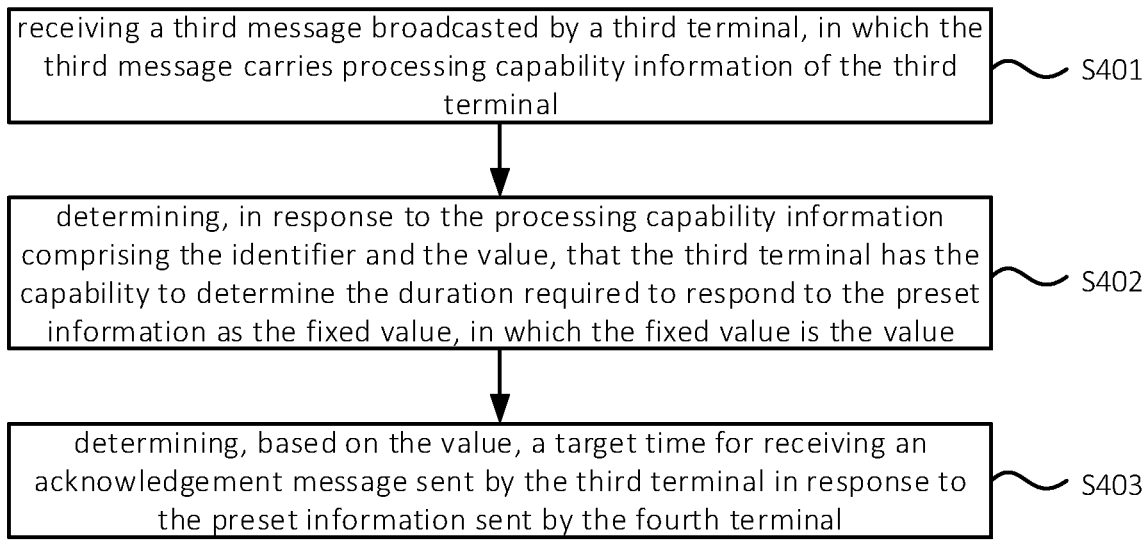
FIG. 9 is a flowchart of a processing capability receiving method according to the embodiment of the disclosure.

FIG. 9 is a flowchart of a processing capability receiving method according to the embodiment of the disclosure. As shown in FIG. 9, the method further includes the following steps.

At step S402, in response to the processing capability information including the identifier and the value, it is determined that the third terminal has the capability to determine the duration required to respond to the preset information as the fixed value, in which the fixed value is the value.

At step S403, based on the value, a target time for receiving an ACK message sent by the third terminal is determined in response to the preset information sent by the fourth terminal.

In an embodiment, where the processing capability information includes the identifier and the value, the fourth terminal can determine that the third terminal has the capability to determine the duration required to respond to the preset information as the fixed value, and the fixed value is the value. The value in the processing capability information represents the duration required for the third terminal to respond to the preset information from the fourth terminal. In the subsequent ranging process, the fourth terminal can determine the target time for receiving the ACK message sent by the third terminal in response to the preset information sent by the fourth terminal based on the value, and thus the ACK message sent by the third terminal at the target time can be received, and the value can be directly used during the ranging process without the need for the second terminal to send the duration required for the first terminal to respond to the preset information to the first terminal again.

Since the third terminal has the capability to determine the duration required to respond to the preset information as the fixed value, the duration required for the third terminal to respond to the preset information is fixed, and then the third terminal only needs to send the value once to the fourth terminal to represent the fixed value, and the duration required for the third terminal to respond to the preset information may not have to be sent to the fourth terminal subsequently.

It is to be noted that in this embodiment and other embodiments, the ACK message sent by the third terminal in response to the preset information sent by the fourth terminal may be an ACK message in response to the ranging request and/or the ranging signal sent by the fourth terminal.

Figure 10:
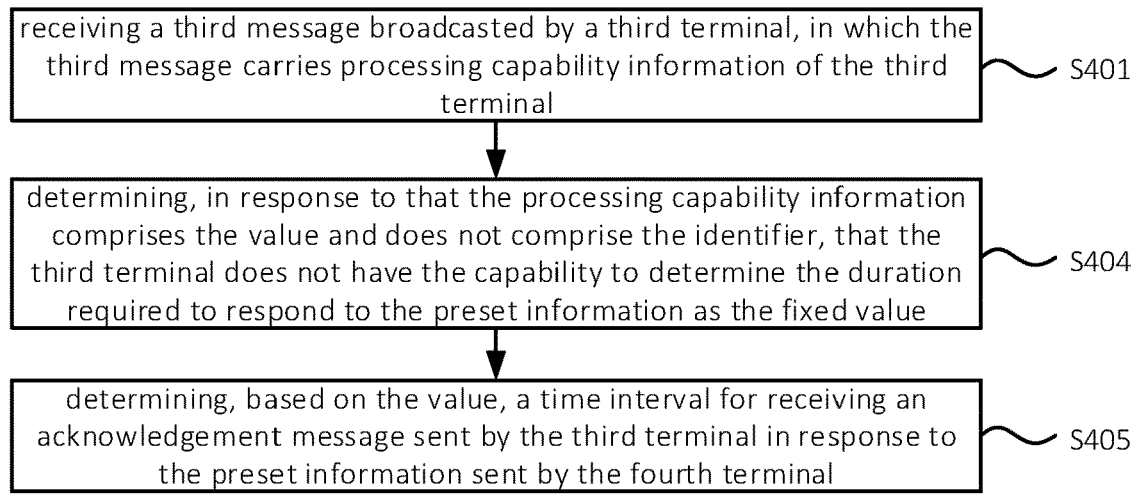
FIG. 10 is a flowchart of a processing capability receiving method according to the embodiment of the disclosure.

FIG. 10 is a flowchart of a processing capability receiving method according to the embodiment of the disclosure. As shown in FIG. 10, the processing capability information includes the value, and the method further includes the following steps.

At step S404, in response to that the processing capability information includes the value and does not include the identifier, it is determined that the third terminal does not have the capability to determine the duration required to respond to the preset information as the fixed value.

At step S405, based on the value, a time interval for receiving an ACK message sent by the third terminal in response to the preset information sent by the fourth terminal is determined.

In an embodiment, when the processing capability information includes the value and does not include the identifier, the fourth terminal may determine that the second terminal does not have the capability to determine the duration required to respond to the preset information as the fixed value, and may also determine that the duration required for the second terminal to respond to the preset information as indicated by the value in the processing capability information is relatively rough. The fourth terminal may not accurately determine the target time in the above embodiment based on the value, but it can determine the time interval for sending the ACK message by the third terminal in response to the preset information sent by the fourth terminal. For example the time interval is greater than or equal to the duration corresponding to the value, so that the ACK message sent by the third terminal can be received based on the time interval to avoid wasting power by trying to receive the ACK message sent by the third terminal too frequently. In the subsequent ranging process, the second terminal also needs to send the time needed to prepare and respond to the preset information to the first terminal.

In order to enable the fourth terminal to determine a specific target time, the third terminal sends the duration required for the third terminal to respond to the preset information sent by the fourth terminal to the fourth terminal when sending the ACK message. However, since the third terminal does not have the capability to determine the duration required to respond to the preset information as the fixed value, the duration required for the third terminal to respond to the preset information is not fixed, and then the third terminal needs to re-determine the duration required for the third terminal to respond to the preset information each time it receives the preset information from the fourth terminal, and sends the determined duration required for the third terminal to respond to the preset information to the fourth terminal.

Figure 11:
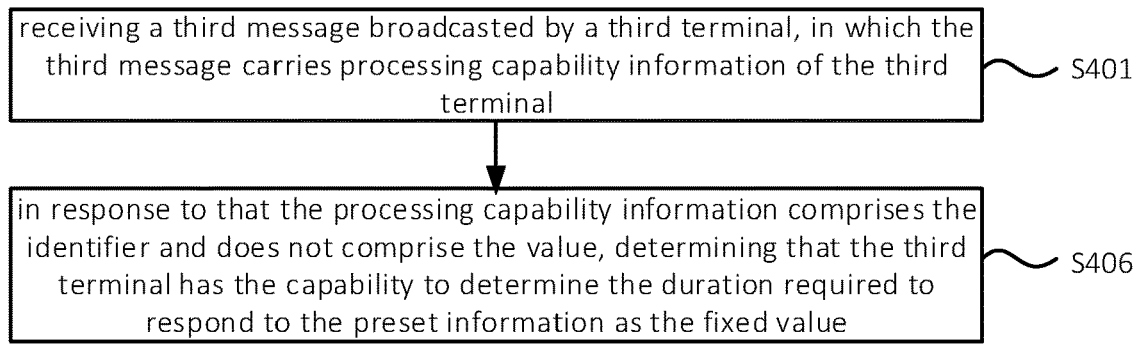
FIG. 11 is a flowchart of a processing capability receiving method according to the embodiment of the disclosure.

FIG. 11 is a flowchart of a processing capability receiving method according to the embodiment of the disclosure. As shown in FIG. 11, the processing capability information includes the identifier, and the method further includes the following steps.

At step S406, in response to that the processing capability information includes the identifier and does not include the value, it is determined that the third terminal has the capability to determine the duration required to respond to the preset information as the fixed value.

In an embodiment, the processing capability information may also include only the identifier, in which case the terminal may determine that the third terminal has the capability to determine the duration required to respond to the preset information as the fixed value, but may fail to send the identifier together with the value to the fourth terminal for some reasons, such as insufficient communication resources. Subsequently, the third terminal sends the value to the fourth terminal, and then the fourth terminal may receive from the third terminal the duration required for the third terminal to respond to the preset information during subsequent communication with the third terminal based on the identifier.

Corresponding to the above embodiments of the processing capability request method, the processing capability sending method, and the processing capability receiving method, the disclosure also provides the embodiments of the processing capability request apparatus, the processing capability sending apparatus, and the processing capability receiving apparatus.

Figure 12:
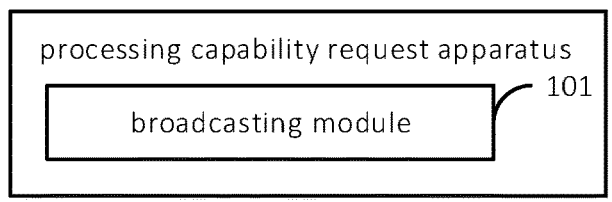
FIG. 12 is a block diagram of a processing capability request apparatus according to the embodiment of the disclosure.

FIG. 12 is a block diagram of a processing capability request apparatus according to the embodiment of the disclosure. The apparatus described in this embodiment may be applicable to the first terminal. The first terminal includes, but is not limited to, a cell phone, a tablet computer, a wearable device, a sensor, and an IoT device. The second terminal in the following embodiment may be the second terminal to which the subsequent processing capability sending apparatus is applicable.

The first terminal may perform the ranging-based services, which include, but are not limited to, measuring a distance to another terminal, measuring an angle relative to another terminal, measuring a distance and an angle relative to another terminal, and measuring a location relative to another terminal.

However, to perform the ranging-based services, other devices need to be involved, so that the first terminal needs to firstly discover other nearby devices that are also capable of performing the ranging-based services. Based on the following embodiments, the first terminal can discover other nearby devices that are also capable of performing the ranging-based services, such as the second terminal. During the ranging-based services, the first terminal may be called a discovery device or an announcing device, and the second terminal may be called a discoveree device or a monitoring/listening device.

As shown in FIG. 12, the processing capability request apparatus includes: a broadcasting module 101.

The broadcasting module 101 is configured to broadcast a first message, in which the first message carries request information, and the request information is configured to request for processing capability information of a second terminal that has received the request information.

Optionally, the processing capability information includes at least one of:
  an amount of data processed per unit of time, or a duration required to respond to preset information.

Optionally, the preset information includes one of request information of a preset service or a reference signal of a preset service, and the duration required to respond to the preset information includes:
  a duration from a time when the second terminal receives the preset information sent by another terminal to a time when the second terminal sends feedback information responded to the preset information to another terminal.

Optionally, the preset information is a synchronization signal, and the duration required to respond to the preset information includes:
  a deviation value of the time when the second terminal receives the synchronization signal sent by another terminal relative to a synchronization raster of the second terminal, and a deviation value of the time when the second terminal sends the synchronization signal to another terminal relative to the synchronization raster of the second terminal.

Figure 13:
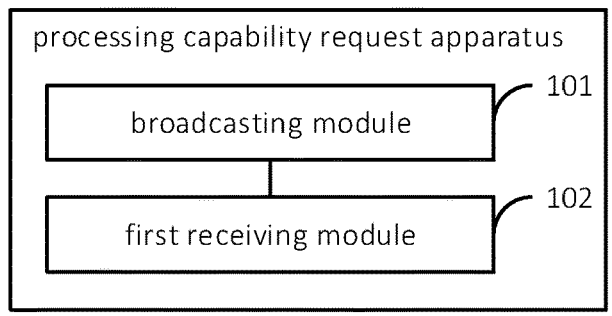
FIG. 13 is a block diagram of a processing capability request apparatus according to the embodiment of the disclosure.

FIG. 13 is a block diagram of a processing capability request apparatus according to the embodiment of the disclosure. As shown in FIG. 13, the processing capability request apparatus includes: a first receiving module 102.

The first receiving module 102 is configured to receive a second message sent by the second terminal, in which the second message includes the processing capability information of the second terminal.

Optionally, the processing capability information includes at least one of:
  an identifier, configured to indicate that the second terminal has the capability to determine the duration required to respond to the preset information as a fixed value; or
  a value, configured to indicate the duration required for the second terminal to respond to the preset information.

Figure 14:
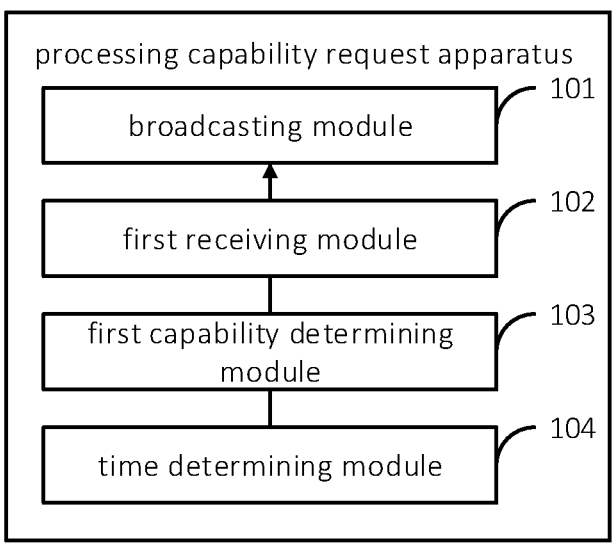
FIG. 14 is a block diagram of a processing capability request apparatus according to the embodiment of the disclosure.

FIG. 14 is a block diagram of a processing capability request apparatus according to the embodiment of the disclosure. As shown in FIG. 14, the processing capability information includes the identifier and the value, and the apparatus further includes: a first capability determining module 103 and a time determining module 104.

The first capability determining module 103 is configured to determine, in response to the processing capability information comprising the identifier and the value, that the second terminal has the capability to determine the duration required to respond to the preset information as the fixed value, in which the fixed value is the value.

The time determining module 104 is configured to determine, based on the value, a target time for receiving an ACK message sent by the second terminal in response to the preset information sent by the first terminal.

Figure 15:
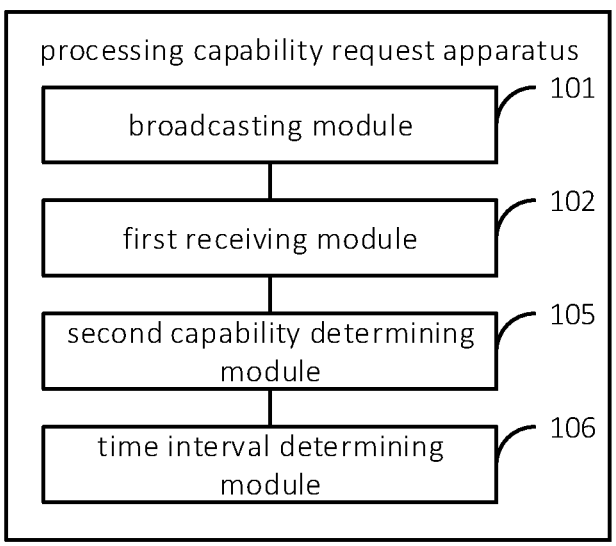
FIG. 15 is a block diagram of a processing capability request apparatus according to the embodiment of the disclosure.

FIG. 15 is a block diagram of a processing capability request apparatus according to the embodiment of the disclosure. As shown in FIG. 15, the processing capability information includes the value, and the apparatus further includes: a second capability determining module 105 and a time interval determining module 106.

The second capability determining module 105 is configured to determine, in response to that the processing capability information comprises the value and does not comprise the identifier that the second terminal does not have the capability to determine the duration required to respond to the preset information as the fixed value.

The time interval determining module 106 is configured to determine, based on the value, a time interval for receiving an ACK message sent by the second terminal in response to the preset information sent by the first terminal.

Figure 16:
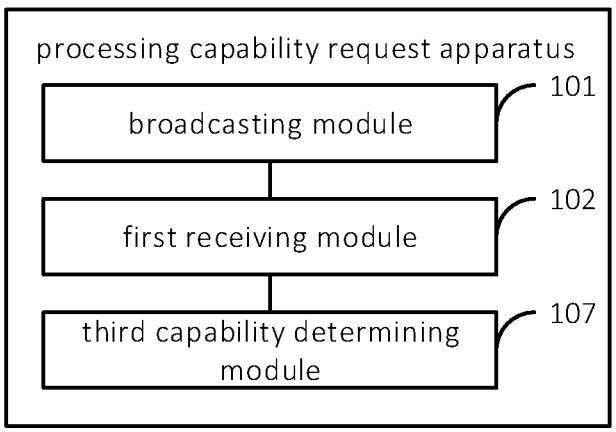
FIG. 16 is a block diagram of a processing capability request apparatus according to the embodiment of the disclosure.

FIG. 16 is a block diagram of a processing capability request apparatus according to the embodiment of the disclosure. As shown in FIG. 16, the processing capability information includes the identifier, and the apparatus further includes: a third capability determining module 107.

The third capability determining module 107 is configured to, in response to that the processing capability information comprises the identifier and does not comprise the value, determine that the second terminal has the capability to determine the duration required to respond to the preset information as the fixed value.

Figure 17:
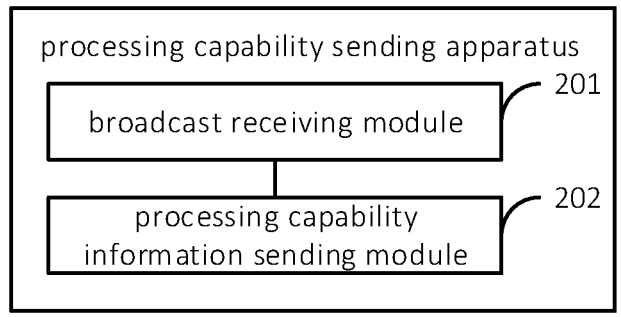
FIG. 17 is a block diagram of a processing capability sending apparatus according to the embodiment of the disclosure.

FIG. 17 is a block diagram of a processing capability sending apparatus according to the embodiment of the disclosure. The apparatus described in this embodiment may be applicable to the second terminal. The second terminal includes, but is not limited to, a cell phone, a tablet computer, a wearable device, a sensor, and an IoT device. The first terminal in the following embodiment may be the first terminal to which the above-described processing capability request apparatus is applicable.

As shown in FIG. 17, the processing capability sending apparatus includes: a broadcast receiving module 201 and a processing capability information sending module 202.

The broadcast receiving module 201 is configured to receive a first message broadcasted by a first terminal, in which the first message carries request information, and the request information is configured to request for processing capability information of a second terminal that has received the request information.

The processing capability information sending module 202 is configured to send the processing capability information to the first terminal.

Optionally, the processing capability information includes at least one of:
  an amount of data processed per unit of time, or a duration required to respond to preset information.

Optionally, the preset information includes one of request information of a preset service or a reference signal of a preset service, and the duration required to respond to the preset information includes:
  a duration from a time when the second terminal receives the preset information sent by another terminal to a time when the second terminal sends feedback information responded to the preset information to another terminal.

Optionally, the preset information is a synchronization signal, and the duration required to respond to the preset information includes:
  a deviation value of the time when the second terminal receives the synchronization signal sent by another terminal relative to a synchronization raster of the second terminal, and a deviation value of the time when the second terminal sends the synchronization signal to another terminal relative to the synchronization raster of the second terminal.

Optionally, the processing capability information includes at least one of:
an identifier, configured to indicate that the second terminal has the capability to determine the duration required to respond to the preset information as a fixed value; or
a value, configured to indicate the duration required for the second terminal to respond to the preset information.

Figure 18:
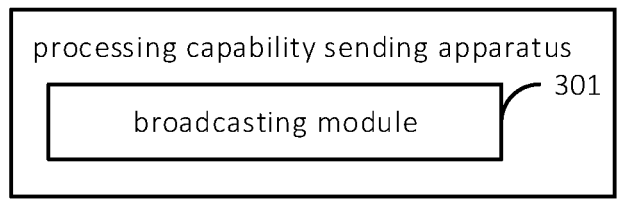
FIG. 18 is a block diagram of a processing capability request apparatus according to the embodiment of the disclosure.

FIG. 18 is a block diagram of a processing capability request apparatus according to the embodiment of the disclosure. The apparatus described in this embodiment may be applicable to the third terminal. The third terminal includes, but is not limited to, a cell phone, a tablet computer, a wearable device, a sensor, and an IoT device. The fourth terminal in the following embodiment may be the fourth terminal to which the above-described processing capability sending apparatus is applicable.

The third terminal may perform the ranging-based services, which include, but are not limited to, measuring a distance to another terminal, measuring an angle relative to another terminal, measuring a distance and an angle relative to another terminal, and measuring a location relative to another terminal.

However, to perform the ranging-based services, other devices need to be involved, so that the third terminal needs to firstly discover other nearby devices that are also capable of performing the ranging-based services. Based on the following embodiments, the third terminal can discover other nearby devices that are also capable of performing the ranging-based services by broadcasting its processing capability information, such as the fourth terminal. During the ranging-based services, the third terminal may be called a discoveree device, and the fourth terminal can be called a discovery device.

As shown in FIG. 18, the processing capability sending apparatus includes: a broadcasting module 301.

The broadcasting module 301 is configured to broadcast a third message, in which the third message carries processing capability information of the third terminal.

Optionally, the processing capability information includes at least one of:
an amount of data processed per unit of time, or a duration required to respond to preset information.

Optionally, the preset information includes one of request information of a preset service or a reference signal of a preset service, and the duration required to respond to the preset information includes:
a duration from a time when the third terminal receives the preset information sent by another terminal to a time when the third terminal sends feedback information responded to the preset information to another terminal.

Optionally, the preset information is a synchronization signal, and the duration required to respond to the preset information includes:
a deviation value of the time when the third terminal receives the synchronization signal sent by another terminal relative to a synchronization raster of the third terminal, and a deviation value of the time when the third terminal sends the synchronization signal to another terminal relative to the synchronization raster of the third terminal.

Optionally, the processing capability information includes at least one of:
an identifier, configured to indicate that the third terminal has the capability to determine the duration required to respond to the preset information as a fixed value; or
a value, configured to indicate the duration required for the third terminal to respond to the preset information.

Figure 19:
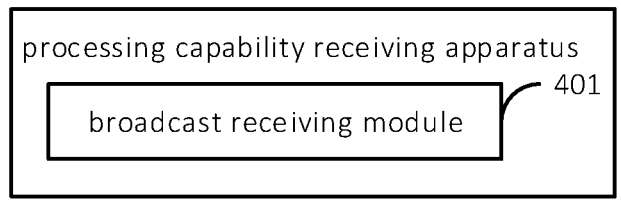
FIG. 19 is a block diagram of a processing capability receiving apparatus according to the embodiment of the disclosure.

FIG. 19 is a block diagram of a processing capability receiving apparatus according to the embodiment of the disclosure. The apparatus described in this embodiment may be applicable to the fourth terminal. The fourth terminal includes, but is not limited to, a cell phone, a tablet computer, a wearable device, a sensor, and an IoT device. The third terminal in the following embodiment may be the third terminal to which the above-described processing capability sending apparatus is applicable.

As shown in FIG. 19, the processing capability receiving apparatus includes:
a broadcast receiving module 401.

The broadcast receiving module 401 is configured to receive a third message broadcasted by a third terminal, in which the third message carries processing capability information of the third terminal.

Optionally, the processing capability information includes at least one of:
an amount of data processed per unit of time, or a duration required to respond to preset information.

Optionally, the preset information includes one of request information of a preset service or a reference signal of a preset service, and the duration required to respond to the preset information includes:
a duration from a time when the third terminal receives the preset information sent by another terminal to a time when the third terminal sends feedback information responded to the preset information to another terminal.

Optionally, the preset information is a synchronization signal, and the duration required to respond to the preset information includes:
a deviation value of the time when the third terminal receives the synchronization signal sent by another terminal relative to a synchronization raster of the third terminal, and a deviation value of the time when the third terminal sends the synchronization signal to another terminal relative to the synchronization raster of the third terminal.

Optionally, the processing capability information includes at least one of:
an identifier, configured to indicate that the third terminal has the capability to determine the duration required to respond to the preset information as a fixed value; or
a value, configured to indicate the duration required for the third terminal to respond to the preset information.

Figure 20:
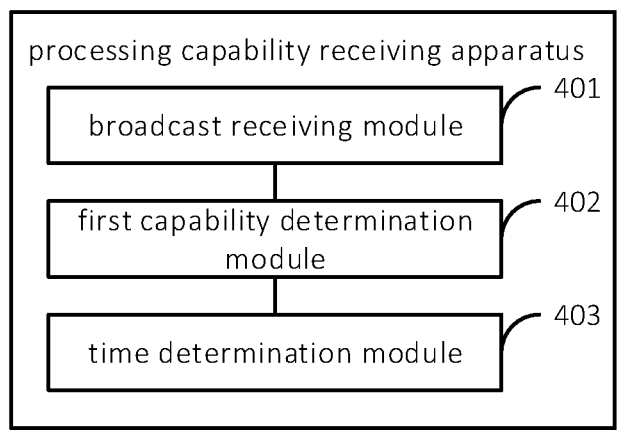
FIG. 20 is a block diagram of a processing capability receiving apparatus according to the embodiment of the disclosure.

FIG. 20 is a block diagram of a processing capability receiving apparatus according to the embodiment of the disclosure. As shown in FIG. 20, the processing capability information includes the identifier and the value, and the apparatus includes: a first capability determination module 402 and a time determination module 403.

The first capability determination module 402 is configured to determine, in response to the processing capability information comprising the identifier and the value, that the third terminal has the capability to determine the duration required to respond to the preset information as the fixed value, in which the fixed value is the value.

The time determination module 403 is configured to determine, based on the value, a target time for receiving an ACK message sent by the third terminal in response to the preset information sent by the fourth terminal.

Figure 21:
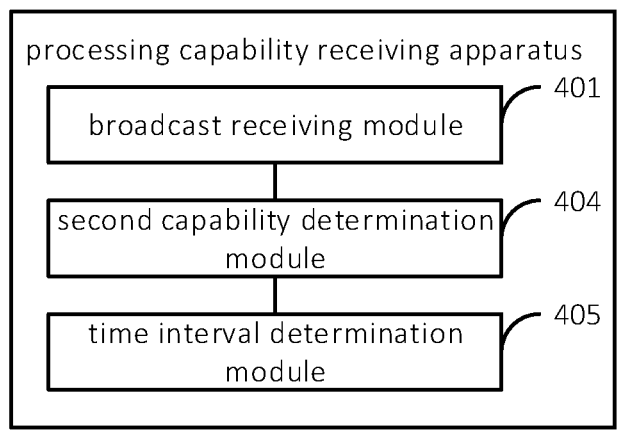
FIG. 21 is a block diagram of a processing capability receiving apparatus according to the embodiment of the disclosure.

FIG. 21 is a block diagram of a processing capability receiving apparatus according to the embodiment of the disclosure. As shown in FIG. 21, the processing capability information includes the value, and the apparatus includes: a second capability determination module 404 and a time interval determination module 405.

The second capability determination module 404 is configured to determine, in response to that the processing capability information comprises the value and does not comprise the identifier that the third terminal does not have the capability to determine the duration required to respond to the preset information as the fixed value.

The time interval determination module 405 is configured to determine, based on the value, a time interval for receiving an ACK message sent by the third terminal in response to the preset information sent by the fourth terminal.

Figure 22:
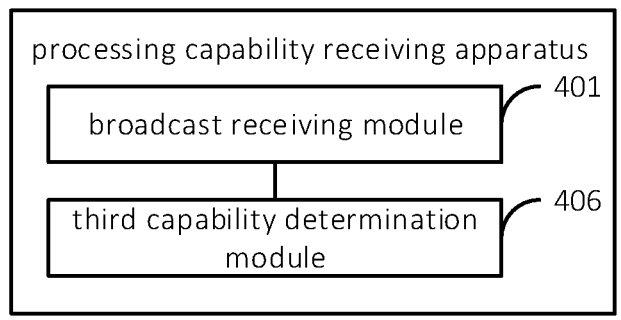
FIG. 22 is a block diagram of a processing capability receiving apparatus according to the embodiment of the disclosure.

FIG. 22 is a block diagram of a processing capability receiving apparatus according to the embodiment of the disclosure. As shown in FIG. 22, the processing capability information includes the identifier, and the apparatus includes: a third capability determination module 406.

The third capability determination module 406 is configured to, in response to that the processing capability information comprises the identifier and does not comprise the value, determine that the third terminal has the capability to determine the duration required to respond to the preset information as the fixed value.

With respect to the apparatus in the above embodiment, the specific way in which each module performs its operation has been described in detail in the embodiments of the relevant method, and will not be described in detail here.

The apparatus embodiments basically correspond to the method embodiments, the related contents can refer to part of the descriptions of the method embodiments. The above-described apparatus embodiments are merely schematic, the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

The embodiment of the disclosure provides an electronic device. The electronic device includes:
- a processor;
- a memory storing instructions executable by the processor; in which
- the processor is configured to implement the processing capability request method of any one of the above embodiments, and/or the processing capability sending method of any one of the above embodiments, and/or the processing capability receiving method of any one of the above embodiments.

The embodiment of the disclosure provides a computer readable storage medium having computer programs stored thereon is provided. When the programs are executed by a processor, the processing capability request method of any one of the above embodiments, and/or the processing capability sending method of any one of the above embodiments, and/or the processing capability receiving method of any one of the above embodiments is implemented.

Figure 23:
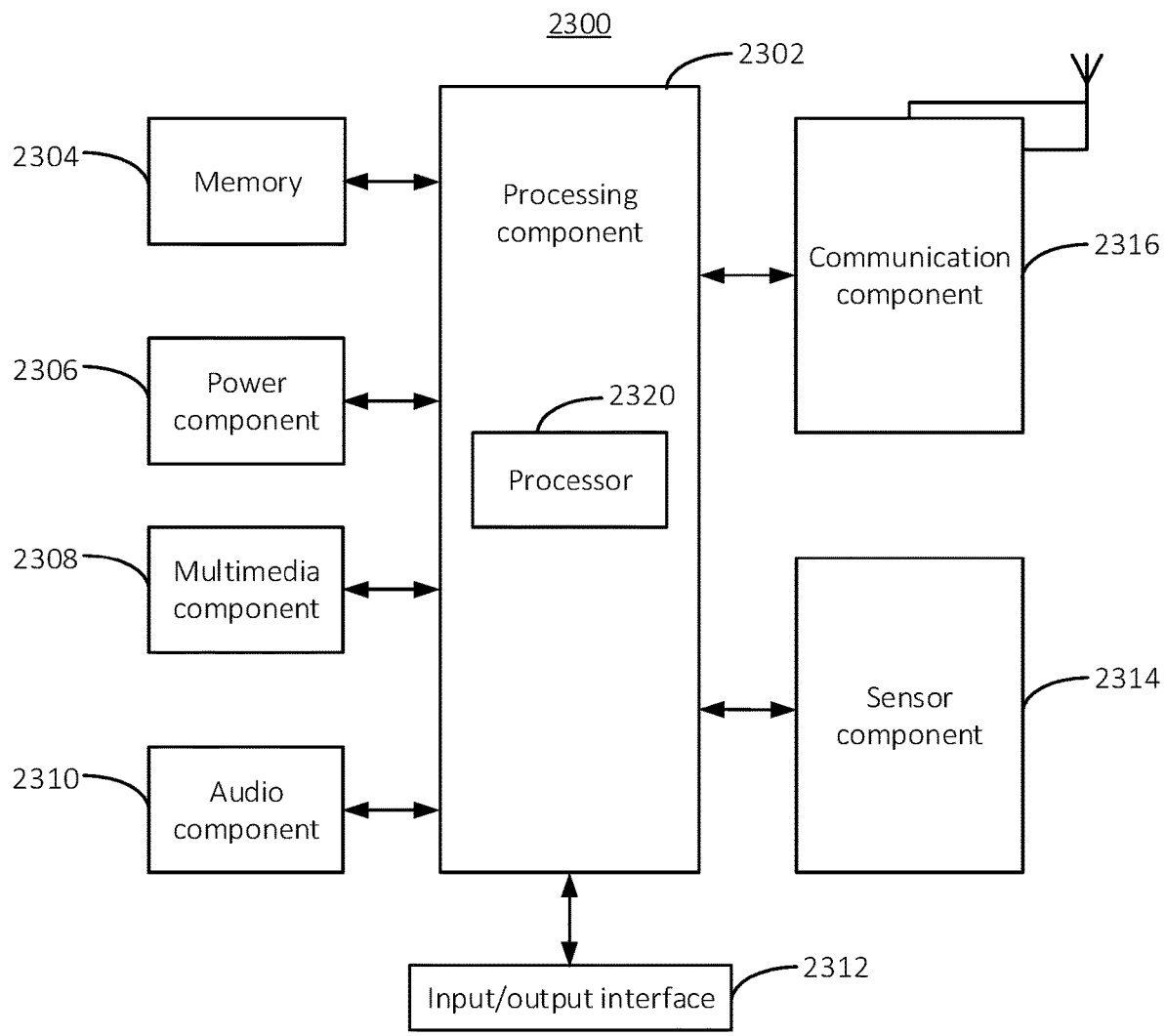
FIG. 23 is a block diagram of a device for implementing the processing capability request method, and/or the processing capability sending method, and/or the processing capability receiving method according to the embodiments of the disclosure.

FIG. 23 is a block diagram of a device 2300 for implementing the processing capability request method, and/or the processing capability sending method, and/or the processing capability receiving method according to the embodiments of the disclosure. For example, the device 2300 may be a mobile phone, a computer, a digital broadcasting terminal, a message transceiver device, a game console, a tablet device, a medical device, a fitness device and a personal digital assistant.

As illustrated in FIG. 23, the device 2300 may include one or more of the following components: a processing component 2302, a memory 2304, a power component 2306, a multimedia component 2308, an audio component 2310, an input/output (I/O) interface 2312, a sensor component 2314, and a communication component 2316.

The processing component 2302 typically controls overall operations of the device 2300, such as the operations associated with display, telephone calls, data communications, camera operations, and recording operations. The processing component 2302 may include one or more processors 2320 to perform all or part of the steps in the above described method. Moreover, the processing component 2302 may include one or more modules which facilitate the interaction between the processing component 2302 and other components. For example, the processing component 2302 may include a multimedia module to facilitate the interaction between the multimedia component 2308 and the processing component 2302.

The memory 2304 is configured to store various types of data to support the operation of the device 2300. Examples of such data include instructions for any applications or methods operated on the device 2300, contact data, phonebook data, messages, pictures, video, etc. The memory 2304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 2306 provides power to various components of the device 2300. The power component 2306 may include a power management system, one or more power sources, and any other components associated with the generation, management, and distribution of power in the device 2300.

The multimedia component 2308 includes a screen providing an output interface between the device 2300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2308 includes a front-facing camera and/or a rear-facing camera. When the device 2300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 2310 is configured to output and/or input audio signals. For example, the audio component 2310 includes a microphone (MIC) configured to receive an external audio signal when the device 2300 is in an operation mode, such as a call mode, a recording mode, and a voice recognition mode. The received audio signal may be further stored in the memory 2304 or transmitted via the communication component 2316. In some embodiments, the audio component 2310 further includes a speaker to output audio signals.

The I/O interface 2312 provides an interface between the processing component 2302 and peripheral interface modules, such as a keyboard, a click wheel, buttons, and the like. The buttons may include, but are not limited to, a home button, a volume button, a starting button, and a locking button.

The sensor component 2314 includes one or more sensors to provide status assessments of various aspects of the device 2300. For instance, the sensor component 2314 may detect an open/closed status of the device 2300, relative positioning of components, e.g., the display and the keypad, of the device 2300, a change in position of the device 2300 or a component of the device 2300, a presence or absence of user contact with the device 2300, an orientation or an acceleration/deceleration of the device 2300, and a change in temperature of the device 2300. The sensor component 2314 may include a proximity sensor configured to detect the presence of nearby objects without any physical contact. The sensor component 2314 may also include a light sensor, such as a Complementary Metal Oxide Semiconductor (CMOS) or Charge-Coupled Device (CCD) image sensor, for use in imaging applications. In some embodiments, the sensor component 2314 may also include an accelerometer sensor, a gyroscope sensor, a magnetic sensor, a pressure sensor, or a temperature sensor.

The communication component 2316 is configured to facilitate communication, wired or wirelessly, between the device 2300 and other devices. The device 2300 can access a wireless network based on a communication standard, such as WiFi, 2G, 3G, 4G LTE, 5G NR or a combination thereof. In an embodiment, the communication component 2316 receives a broadcast signal or broadcast associated information from an external broadcast management system via a broadcast channel. In an embodiment, the communication component 2316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In some embodiments, the device 2300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In some embodiments, there is also provided a non-transitory computer readable storage medium including executable instructions, such as the memory 2304, executable by the processor 2320 in the device 2300, for performing the above method. For example, the non-transitory computer-readable storage medium may be a ROM, a Random Access Memory (RAM), a CD-ROM, a magnetic tape, a floppy disc, and an optical data storage device.

According to the embodiments of the disclosure, by carrying the request information in the first message broadcasted, the first terminal can not only determine which nearby terminals can perform the ranging-based services, but also enable the second terminal supporting the ranging-based services to send the processing capability information of the second terminal to the first terminal, so that the first terminal can determine, according to the processing capability information, a subsequent ranging method and a duration required for the second terminal to respond to ranging information, which is beneficial to the subsequent raging process of the first terminal and the second terminal. Moreover, a distance between the first terminal and the second terminal is further determined, to allow the ranging-based services with the second terminal.

By carrying the processing capability information in the third message broadcasted, after the fourth terminal receives the third message, if the fourth terminal supports the ranging-based services, the duration required for the third terminal to respond to the ranging information can be determined based on the processing capability information of the third terminal in the third message, so that the fourth terminal can carry out a subsequent ranging process with the third terminal, and further determine the distance between the third terminal and the fourth terminal for the ranging-based services with the third terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The method and apparatus of the embodiments of the disclosure have been described in detail above, and specific examples are applied in the disclosure to illustrate the principles and implementation of the disclosure. The above embodiments are only used to facilitate understanding the method and core ideas of the disclosure. Meanwhile, for those skilled in the art, according to the ideas of this disclosure, there will be changes in the specific implementation and scope of application. In conclusion, the contents of the disclosure should not be understood as limiting the disclosure.

What is claimed is:

1. A processing capability information request method, comprising:
   broadcasting, by a first terminal, a first message, wherein the first message carries request information, the request information is configured to request for processing capability information of a second terminal that has received the request information, and the processing capability information comprises at least one of:
      an identifier, configured to indicate that the second terminal has a capability to determine the duration required to respond to a preset information as a fixed value; or
      a value, configured to indicate the duration required to respond to the preset information for the second terminal;
   determining, by the first terminal, in response to that the processing capability information comprises the value but not the identifier, that the second terminal does not have the capability to determine the duration required to respond to the preset information as the fixed value; and
   determining, by the first terminal, based on the value, a time interval for receiving an acknowledgement message sent by the second terminal in response to the preset information sent by the first terminal.

2. The method of claim 1, wherein the processing capability information comprises at least one of:
   an amount of data processed per unit of time, or a duration required to respond to preset information.

3. The method of claim 2, wherein the preset information comprises one of request information of a preset service, or a reference signal of a preset service, and wherein the duration required to respond to the preset information comprises:
   a duration from a time when the second terminal receives the preset information sent by another terminal to a time when the second terminal sends feedback information responded to the preset information to the another terminal.

4. The method of claim 2, wherein the preset information is a synchronization signal, and the duration required to respond to the preset information comprises:
   a deviation value of the time when the second terminal receives the synchronization signal sent by another terminal relative to a synchronization raster of the second terminal, and a deviation value of the time when the second terminal sends the synchronization signal to the another terminal relative to the synchronization raster of the second terminal.

5. The method of claim 1, further comprising:
   receiving a second message sent by the second terminal, wherein the second message comprises the processing capability information of the second terminal.

6. The method of claim 1, further comprising:
   determining, in response to the processing capability information comprising the identifier and the value, that the second terminal has the capability to determine the duration required to respond to the preset information as the fixed value, wherein the fixed value is the value; and
   determining, based on the value, a target time for receiving an acknowledgement message sent by the second terminal in response to the preset information sent by the first terminal.

7. The method of claim 1, further comprising:
   in response to that the processing capability information comprises the identifier but not the value, determining that the second terminal has the capability to determine the duration required to respond to the preset information as the fixed value.

8. An electronic device, comprising:
   a processor;
   a memory storing instructions executable by the processor; wherein
   the processor is configured to implement the processing capability information request method of claim 1.

9. A processing capability information sending method, comprising:
   receiving, by a second terminal, a first message broadcasted by a first terminal, wherein the first message carries request information, and the request information is configured to request for processing capability information of the second terminal that has received the request information;
   sending, by the second terminal, the processing capability information of the second terminal to the first terminal, wherein the processing capability information comprises at least one of:
      an identifier, configured to indicate that the second terminal has a capability to determine the duration required to respond to a preset information as a fixed value; or
      a value, configured to indicate the duration required to respond to the preset information for the second terminal,
   wherein in response to that the processing capability information comprises the value but not the identifier, the first terminal determines that the second terminal does not have the capability to determine the duration required to respond to the preset information as the fixed value, and the first terminal determines, based on the value, a time interval for receiving an acknowledgement message sent by the second terminal in response to the preset information sent by the first terminal.

10. The method of claim 9, wherein the processing capability information comprises at least one of:
    an amount of data processed per unit of time, or a duration required to respond to preset information.

11. The method of claim 10, wherein the preset information comprises one of request information of a preset service, or a reference signal of a preset service, and wherein the duration required to respond to the preset information comprises:
    a duration from a time when the second terminal receives the preset information sent by another terminal to a time when the second terminal sends feedback information responded to the preset information to the another terminal.

12. The method of claim 11, wherein the preset information is a synchronization signal, and the duration required to respond to the preset information comprises:
   a deviation value of the time when the second terminal receives the synchronization signal sent by the another terminal relative to a synchronization raster of the second terminal, and a deviation value of the time when the second terminal sends the synchronization signal to the another terminal relative to the synchronization raster of the second terminal.

13. An electronic device, comprising:
   a processor;
   a memory storing instructions executable by the processor; wherein the processor is configured to implement the processing capability information sending method of claim 9.

14. A processing capability information sending method, comprising:
   broadcasting, by a third terminal, a third message, wherein the third message carries processing capability information of the third terminal,
   wherein the processing capability information comprises at least one of:
   an identifier, configured to indicate that the second terminal has a capability to determine the duration required to respond to a preset information as a fixed value; or
   a value, configured to indicate the duration required to respond to the preset information for the second terminal,
   wherein in response to that the processing capability information comprises the value but not the identifier, the third terminal does not have the capability to determine the duration required to respond to the preset information as the fixed value; and a time interval for receiving an acknowledgement message sent by the third terminal in response to the preset information sent by a fourth terminal is determined by the fourth terminal based on the value.

15. The method of claim 14, wherein the processing capability information comprises at least one of:
   an amount of data processed per unit of time, or a duration required to respond to preset information.

16. The method of claim 15, wherein the preset information comprises one of request information of a preset service, or a reference signal of a preset service, and wherein the duration required to respond to the preset information comprises:
   a duration from a time when the third terminal receives the preset information sent by another terminal to a time when the third terminal sends feedback information responded to the preset information to the another terminal.

17. An electronic device, comprising:
   a processor;
   a memory storing instructions executable by the processor; wherein the processor is configured to implement the processing capability information sending method of claim 14.

* * * * *